April 4, 1939.  J. F. FORD  2,153,458
VALVE
Filed May 27, 1937   2 Sheets-Sheet 1

Inventor
Jacob F. Ford
By L. F. Randolph
Attorney

April 4, 1939.                J. F. FORD                2,153,458
                               VALVE
                        Filed May 27, 1937           2 Sheets-Sheet 2
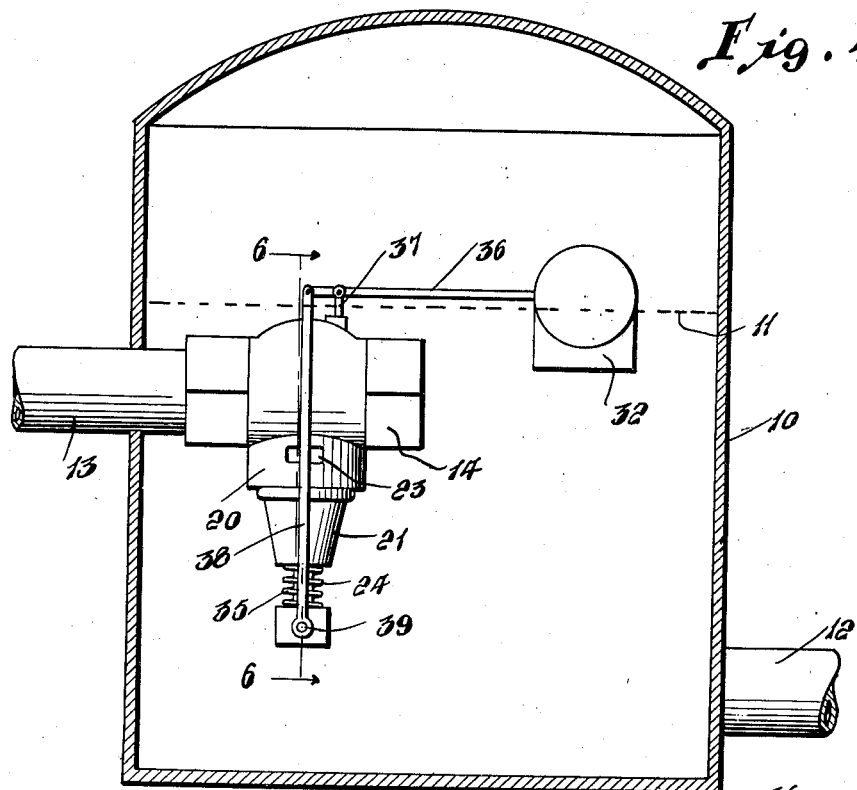
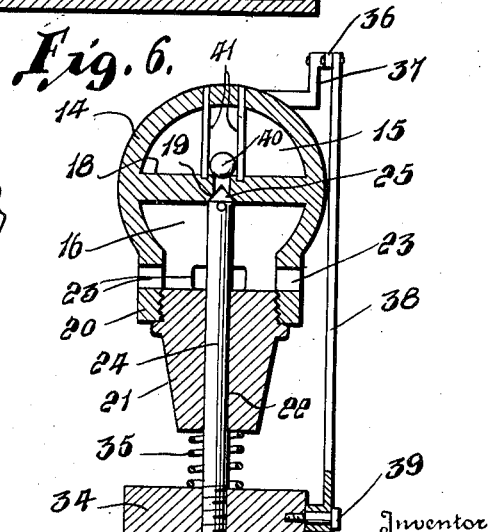
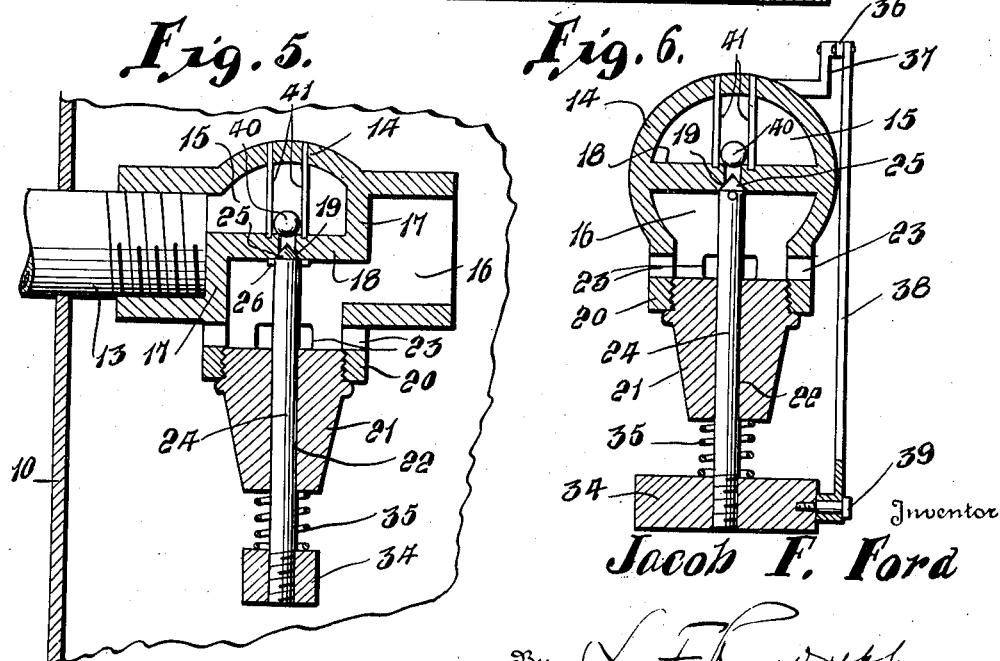
Inventor
Jacob F. Ford
By L. F. Rudolph
                    Attorney Patented Apr. 4, 1939

2,153,458

UNITED STATES PATENT OFFICE 2,153,458

VALVE

Jacob F. Ford, Konawa, Okla.

Application May 27, 1937, Serial No. 145,163

1 Claim. (Cl. 137—68)

This invention relates to an improved float controlled valve.

The object of the invention is to provide a valve contained in a receptacle to control the outlet pipe communicating with said receptacle so that the pipe will be automatically closed when the liquid in the receptacle reaches a predetermined point.

A further object of the invention is to provide valve means whereby an outlet pipe will be shut off when the level of the liquid in a container falls below a certain point, to prevent air entering said container through said pipe.

Figure 1:
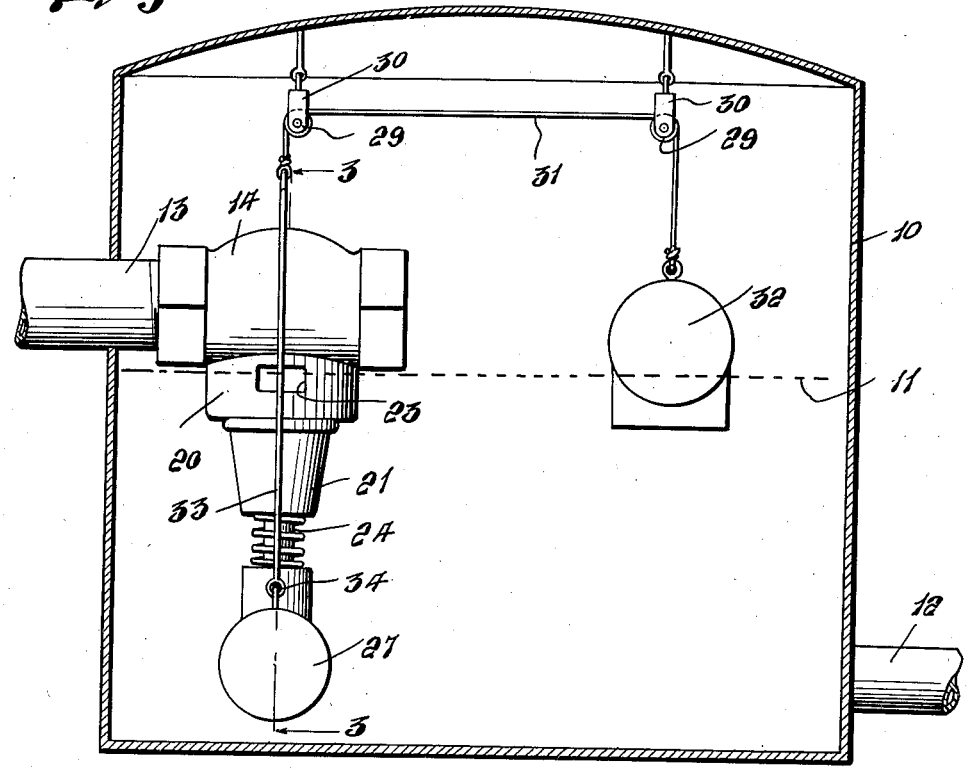
Figure 2:
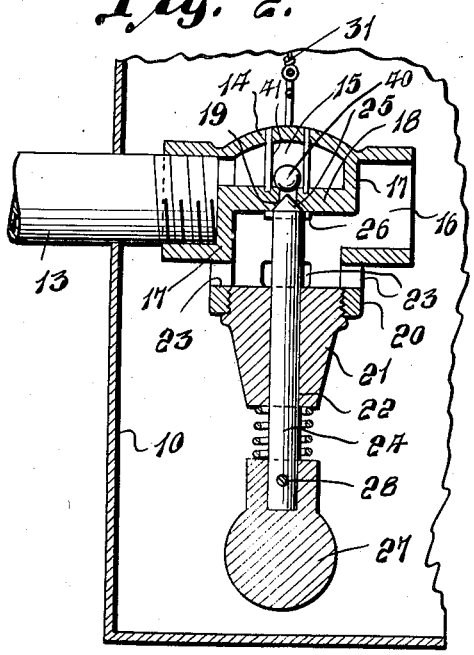
Figure 3:
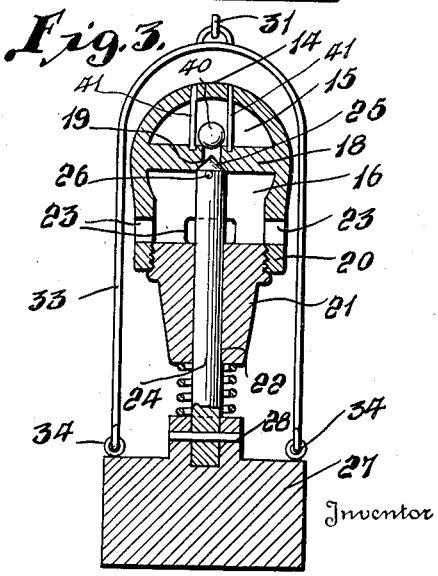

Other objects and advantages of the invention will become apparent from the specification of which the drawings form a part, and wherein:

Figure 1 is a side elevational view of the invention contained in the receptacle which is shown in section, Figure 2 is a fragmentary sectional view in side elevation showing the valve means, Figure 3 is a cross sectional view of the same on the line 3—3 of Figure 1, Figure 4 is a view similar to Figure 1 of a modified means to control the valve, Figure 5 is a view similar to Figure 2 showing the modified form, and Figure 6 is a view similar to Figure 3 showing the modified form.

Referring more particularly to the drawings wherein like reference characters designate like or corresponding parts in the different views, the receptacle 10 contains a liquid 11 which enters receptacle 10 through an inlet pipe 12.

An outlet pipe 13 extends into receptacle 10 and has a casing 14 mounted thereon. Casing 14 is hollow and contains corresponding recesses 15 and 16 which are separated by vertical walls 17 and a horizontal wall 18. A valve seat 19 formed in wall 18 forms a passage between recesses 15 and 16 and receptacle 10 and pipe 13.

Casing 14 is provided with an annular internally threaded flange 20 into which is secured a threaded plug 21 provided with a bore 22. Flange 20 is provided with spaced openings 23 which communicate with recess 16. A valve stem 24 is slidably mounted in bore 22 and is provided with a pointed end 25 forming the valve which is adapted to engage the valve seat 19 to shut off pipe 13. Stem 24 is provided with a pin 26 adapted to limit the movement of stem 24.

A weight 27 is secured to the lower end of valve stem 24 by means of a pin 28 which extends through an opening in the weight 27 and in the stem 24 to normally hold valve 25 in an open position.

A pair of pulleys 29 are journaled in hangers 30 which are secured to the top of receptacle 10. A cable 31 engages pulleys 29 and has a float 32 secured to one end thereof. The opposite end of cable 31 is secured to a U-shaped hanger 33. The opposite ends of hanger 33 are connected to eyelets 34 secured to weight 27.

Figures 4, 5 and 6 illustrate a modification of the invention, wherein a cross head 34 is secured to the end of stem 24 and a coil spring 35 is mounted on stem 24 between plug 21 and cross head 34 to normally urge stem 24 downwardly.

Float 32 is secured to one end of a lever 36 which is pivoted to a bracket 37 mounted on casing 14. The opposite end of lever 36 is connected to rod 38 which is also connected by bolt 39 to cross head 34.

A ball valve 40 is mounted in a cage 41 formed of four vertical rods forming guides. Valve 40 is a one way valve and is adapted to close opening 19 from above to prevent liquid flowing from pipe 13 back into tank 10 in case the pressure in pipe 13 becomes greater than the pressure in tank 10. The flow from tank 10 to pipe 13 will raise valve 40.

In operation, when the liquid level in receptacle 10 falls below a certain point float 32 will lift weight 27 or cross head 34 causing valve 25 to move upwardly and engage valve seat 19 shutting off pipe 13 to prevent air entering the tank 10. As the liquid level rises float 32 will move upwardly permitting weight 27 or spring 35 to draw valve 25 downwardly to permit the liquid 11 to pass out through pipe 13.

It is to be understood that only the preferred embodiment of the invention has been shown, the right being reserved to make such changes and modifications as will not depart from the spirit and scope of the invention as claimed.

I claim as my invention:

In combination with a liquid storage tank provided with inlet and outlet pipes, a casing having oppositely disposed open ends, a partition disposed longitudinally within said casing between said ends and including a longitudinally disposed intermediate portion provided with a vertical passage, said casing having a depending open end disposed beneath said intermediate portion, a plug removably mounted in said depending end and provided with a longitudinal bore disposed in alinement with said passage, a needle valve slidably mounted in said bore, one end of said needle valve being tapered to seat in and close the lower end of said passage, a head mounted on the opposite end of said needle valve and spaced from said plug, an expansion coil spring disposed between said plug and head for urging said needle valve into an open position, said casing being adapted to be disposed within said tank with one of its ends connected to the outlet pipe, said needle valve being disposed in the opposite end thereof, a float mounted in said tank and connected to said abutment and adapted to be actuated by the level of a liquid contained therein for closing the valve against the action of said spring, and a gravity actuated valve mounted in the first mentioned end of said casing and adapted for seating in the upper end of said passage.

JACOB F. FORD.